United States Patent
Bacabara et al.

(10) Patent No.: US 8,224,508 B2
(45) Date of Patent: Jul. 17, 2012

(54) VIEWING DEVICE FOR AIRCRAFT COMPRISING MEANS OF DISPLAYING THE FINAL DESTINATION AND ASSOCIATED DISPLAY METHOD

(75) Inventors: Corinne Bacabara, Le Haillan (FR); Christian Nouvel, Merignac (FR); Jean-Noel Perbet, Eysines (FR)

(73) Assignee: Thales (FR)

( * ) Notice: Subject to any disclaimer, the term of this patent is extended or adjusted under 35 U.S.C. 154(b) by 510 days.

(21) Appl. No.: 12/547,595

(22) Filed: Aug. 26, 2009

(65) Prior Publication Data

US 2010/0063655 A1 Mar. 11, 2010

(30) Foreign Application Priority Data

Sep. 5, 2008 (FR) ...................... 08 04888

(51) Int. Cl.
*G06F 19/00* (2006.01)
(52) U.S. Cl. ........................................................ 701/16
(58) Field of Classification Search ............... 701/16, 701/17, 14, 301; 73/178 T; 342/29–32; 244/183, 184
See application file for complete search history.

(56) References Cited

U.S. PATENT DOCUMENTS

| | | | |
|---|---|---|---|
| 5,892,462 A * | 4/1999 | Tran ........................... | 340/961 |
| 6,199,008 B1 | 3/2001 | Aratow et al. | |
| 6,216,065 B1 * | 4/2001 | Hall et al. ..................... | 701/16 |
| 6,255,965 B1 * | 7/2001 | D'Orso ......................... | 340/946 |
| 7,010,398 B2 * | 3/2006 | Wilkins et al. ................ | 701/3 |
| 7,269,513 B2 * | 9/2007 | Herwitz ........................ | 701/301 |
| 7,852,236 B2 * | 12/2010 | Feyereisen et al. ........... | 340/971 |
| 8,068,038 B2 * | 11/2011 | Engels et al. ................. | 340/970 |
| 2010/0145610 A1 * | 6/2010 | Bacabara et al. ............. | 701/208 |

FOREIGN PATENT DOCUMENTS

| | | |
|---|---|---|
| EP | 1906151 A | 4/2008 |
| EP | 1916503 A1 | 4/2008 |

OTHER PUBLICATIONS

Pruyn P W; Greenberg D P: "Exploring 3D computer graphics in cockpit avionics" IEEE Computer Grpahics & Applications, vol. 13, No. 3, (May 1993), pp. 28-35, XP002527870; USA.
U.S. Appl. No. 12/542,008, filed Aug. 17, 2009, Inventor(s): Corinne Bacabara et al; not yet Published.
U.S. Appl. No. 12/542,114, filed Aug. 17, 2009, Inventor(s): Christian Nouvel et al; not yet Published.
U.S. Appl. No. 12/542,965, filed Aug. 18, 2009, Inventor(s): Christian Nouvel et al; not yet Published.
U.S. Appl. No. 12/540,920, filed Aug. 13, 2009, Inventor(s): Christian Nouvel et al; not yet Published.

* cited by examiner

*Primary Examiner* — Faye M. Fleming
(74) *Attorney, Agent, or Firm* — Lowe Hauptman Ham & Berner, LLP

(57) ABSTRACT

The general field of the invention is that of synthetic vision system SVS type viewing systems, for aircraft, said system comprising at least one navigation database, a cartographic database of a terrain, position sensors, anemometric sensors, sensors for measuring the gradient of said terrain, an electronic computer, a man-machine interface means and a display screen, the computer comprising means of processing the various information obtained from the databases, from the sensors and from the interface means, said processing means arranged so as to provide on the display screen a synthetic image of the terrain comprising a representation of the final destination in the form of an air sock of aeronautical type.

6 Claims, 3 Drawing Sheets ized to provide on the display screen a synthetic image of the terrain comprising a representation of the final destination, characterized in that said representation includes a physical representation of an aeronautical-type air sock.

VIEWING DEVICE FOR AIRCRAFT COMPRISING MEANS OF DISPLAYING THE FINAL DESTINATION AND ASSOCIATED DISPLAY METHOD

RELATED APPLICATIONS

The present application is based on, and claims priority from, French Application Number 08 04888, filed Sep. 5, 2008, the disclosure of which is hereby incorporated by reference herein in its entirety.

BACKGROUND OF THE INVENTION

1. Field of the Invention

The general technical field of the invention is that of synthetic vision systems, known by the acronym SVS, used more particularly in aeronautics to present piloting or navigation information to the pilot in the most ergonomic possible way. In the present case, the graphic representation concerns the display of the final destination.

2. Description of the Prior Art

The SVS-type display devices provide the pilot with a better awareness of the surrounding hazards such as collisions with the ground with no loss of control, commonly called CFIT which stands for "Controlled Flight Into Terrain". CFITs are the leading cause of catastrophic civilian airplane accidents. The aeronautical industry focuses its efforts on means for reducing them or even finally eliminating them. Generally, the SVS systems display a synthetic terrain and the natural obstacles or human constructions in perspective. Thus, the pilot has the most realistic possible perception of the external landscape. Conventionally, the SVS data are displayed on a screen which is commonly called PFD, standing for "Primary Flight Display".

For certain applications, it is very important for the pilot to be very certain of his final destination. In practice, in some cases, in particular in rescue operations carried out by small aircraft or helicopters, the pilot needs to be able to easily and rapidly find the final landing zone, which may be located in areas that are difficult to access such as mountain areas or dense forests. For air work in equatorial forests, this landing zone for a helicopter may be only an area where a few trees have been previously cut down. At low overflight altitude, it is therefore almost impossible to identify this area. The system according to the invention provides a way of displaying on the SVS the final destination to which the aircraft pilot must go in an extremely intuitive and ergonomic manner. The invention enables the pilot to be better directed by being aware of the direction that he must follow and to better view the goal to be reached and its environment by correlating the view originating from the SVS and the external environment. The pilot's workload is thus reduced and his stress is lessened. Furthermore, this representation provides the pilot with crucial landing data, namely the direction and speed of the wind and the inclination of the terrain. This last item of information is very important for helicopter pilots who must always place the nose of their gradient craft towards the top of the slope in order to safeguard the tail and the anti-torque rotor of the craft.

SUMMARY OF THE INVENTION

More specifically, the subject of the invention is a viewing system of the synthetic vision system SVS type, for aircraft, said system comprising at least one navigation database, a cartographic database of a terrain, position sensors, anemometric sensors, terrain gradient measurement sensors, an electronic computer, a man-machine interface means and a display screen, the computer comprising means of processing the various information obtained from the databases, from the sensors and from the interface means, said processing means arranged to provide on the display screen a synthetic image of the terrain comprising a representation of the final destination, characterized in that said representation includes a physical representation of an aeronautical-type air sock.

Advantageously, the physical representation of the air sock comprises three parts, a bottom part situated at the conformal location of the position of the final destination on the terrain, a vertical junction line and a perspective representation of the air sock itself positioned above said junction line.

More specifically, the form and the orientation of the bottom part is representative of the local gradient of the terrain at the location of said air sock. The bottom part can be an ellipse, the inclination of which is representative of the local gradient of the terrain, said ellipse having two faces of different colour or texture (shading, etc.), the displayed colour being representative of the direction of the gradient as seen from the aircraft.

Preferably, the junction line has a sufficient size for the standardized symbol to dominate the surrounding terrain and not be concealed by the relief.

Advantageously, the perspective representation of the air sock has the form of an elongate truncated cone comprising five rings, the first, third and fifth rings being of a first colour, the second and fourth rings being of a second colour, the orientation of the cone being representative of the wind direction, the cone including a break, the set of rings positioned in front of the break representing the wind speed. Each ring represents a given wind speed, for example five knots.

Furthermore, from a certain distance, the representation of the air sock has an apparent display size that is representative of a constant size on the terrain.

The invention also relates to a final destination display method for synthetic vision system (SVS) type viewing system mounted on an aircraft, said system comprising at least one navigation database, a cartographic database of a terrain, position sensors, anemometric sensors, sensors for measuring the gradient of said terrain, an electronic computer, a man-machine interface means and a display screen, the computer comprising means of processing the various information obtained from the databases, from the sensors and from the interface means, said processing means arranged so as to provide on the display screen a synthetic image of the terrain including a representation of the final destination, characterized in that the method comprises the following steps:

reception of the coordinates of the final destination and analysis of the latter;

determination of the distance to said final destination;

if the final destination is at a distance less than a first distance, computation of the anemometric parameters and of the local gradient of the terrain;

display of the final destination in the form of an air sock represented in perspective on the display screen.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
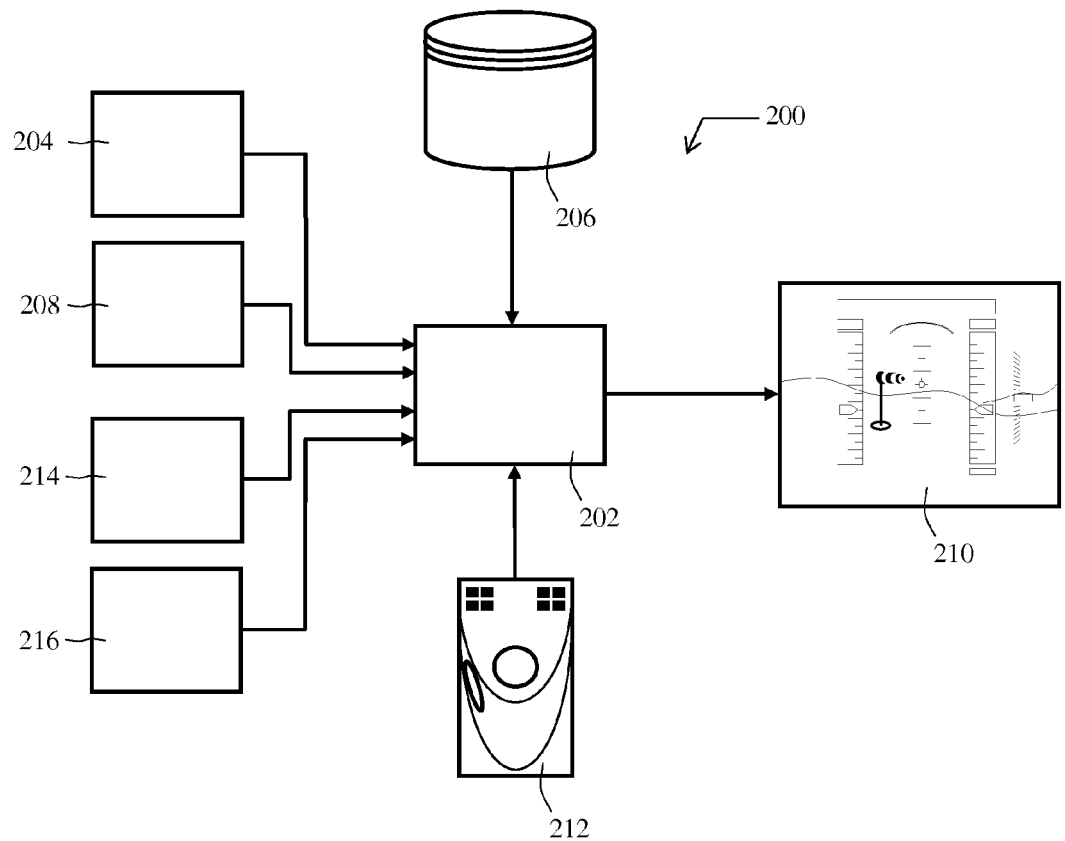
FIG. 1 is the diagram of a viewing system according to the invention.

As an example, FIG. 1 represents one possible embodiment of a system according to the invention for aeronautical applications. The graphical display system 200 is installed in an aircraft and comprises a computer or a processor 202 configured to provide a viewing screen 210 with the information to be displayed.

One or more data sources are linked to the processor 202. These data sources include a cartographic database or information regarding the terrain 206 used to plot the perspective view. These databases are generally positioned in the aircraft. The data can also originate from the ground via transmission means or "data links". Furthermore, these data can be stored on different peripheral devices such as diskettes, hard disks, CD-ROMs, volatile memories, non-volatile memories, RAMs or any other means that can be used to store data.

The system comprises an input system called "DIRECT TO" 204 which can be a "GPS" system, GPS being an acronym standing for Global Positioning System, a flight management system or FMS or any other system enabling the pilot to enter the coordinates of the final destination. The system also comprises positioning sensors 208, anemometric sensors 214 giving the direction and speed of the wind and terrain gradient sensors 216. Finally, the system includes display control means 212. These means are, for example, as represented in FIG. 1, a CCD (Cursor Control Device), a means similar to a computer "mouse". It may also be a control station comprising buttons, potentiometers, etc.

The processor 202 is interfaced with hardware components which provide a graphical rendition. For example, these hardware components are one or more microprocessors, memories, storage appliances, interface cards or any other standard components. Furthermore, the processor 202 runs with software or firmware. It is capable of reading machine instructions to perform various tasks, computations and control functions and generate the signals to be displayed and the other data used by the display screen. These instructions can be stored on diskettes, hard disks, CD-ROMs, volatile memories, non-volatile memories, RAMs or any other means that can be used to store data. All these means are known to those skilled in the art.

The display screen 210 can be a cathode ray tube (CRT) type screen, a liquid crystal display (LCD) screen or any other screen type. The display screen is generally an instrument panel screen. However, the display is not limited to this single type of screen. Thus, the display screen 210 can be the source of images for a head-up display (HUD), or be part of a headset viewing optic or night-vision goggles JVN. This display screen 210 can also be the source of images for a windshield projection system.

The processor 202 supplies the data to be displayed to the display screen 210 based on the position of the aeroplane obtained from the navigation sensors 208, from the terrain databases 206 and from the "DIRECT TO" input system 204 which provides the position of the final destination. The processor 202 is configured to receive and compute the aeroplane data, namely the latitude/longitude position, speed, heading, etc., based on the current location of the aeroplane obtained from the navigation sensors 208 which can be an inertial unit, a GPS, etc.

Based on the position data, the processor 202 obtains the terrain data from the terrain database 206. It sends these data to the display screen 210 to represent a synthetic image.

The processor 202 analyses the data obtained from the input means 204 and determines whether this DIRECT TO point is contained within a selected distance d1 from the aircraft. It may be, for example, 10 NM (Nautical Miles). If the point is not contained within this radius of action d1, then it is not displayed on screen. This function has the two-fold benefit of limiting the workload of the processor and improving the legibility of the image by reducing the number of symbols displayed, an operation known by the term "decluttering", since it displays only the DIRECT TO point only when the latter is useful to the pilot of the aircraft. The selected distance d1 can be either imposed by the crew through the control means 212 or be a distance computed by the processor 202 by taking into account several criteria such as the speed of the aircraft, the size of the aircraft, the size of the screen 210 or any other criteria.

The terrain gradient sensor 216 is a means enabling the processor 202 to determine the gradient of the terrain present at the final destination. This means can equally be a terrain database which contains this information or terrain information enabling the processor 202 to compute this gradient. This data can be directly sent from the ground and received by the sensor 216 present in the aircraft then transmitted to the processor 202.

The wind parameter sensor 214 is means enabling the processor 202 to determine the direction and the speed of the wind present at the final destination. This means can be a GPS or FMS type system which can perform this computation and send the data to the processor 202 or any other means that supplies the processor 202 with the data that it needs to perform this determination. These data concerning the wind can also be sent directly from the ground and received by the sensor 214 present in the aircraft then transmitted to the processor 202.

The processor 202 then determines the graphical representation of the final destination represented by an air sock (height, positioning, etc.).

The general perspective view can be egocentric, that is to say, seen from the current position of the aircraft, or exocentric, that is to say, seen from a point other than the current position of the aircraft. The user can choose between these two representation modes through the control means 212. The display or non-display of the final destination point can be done based on control means 212.

Figure 2:
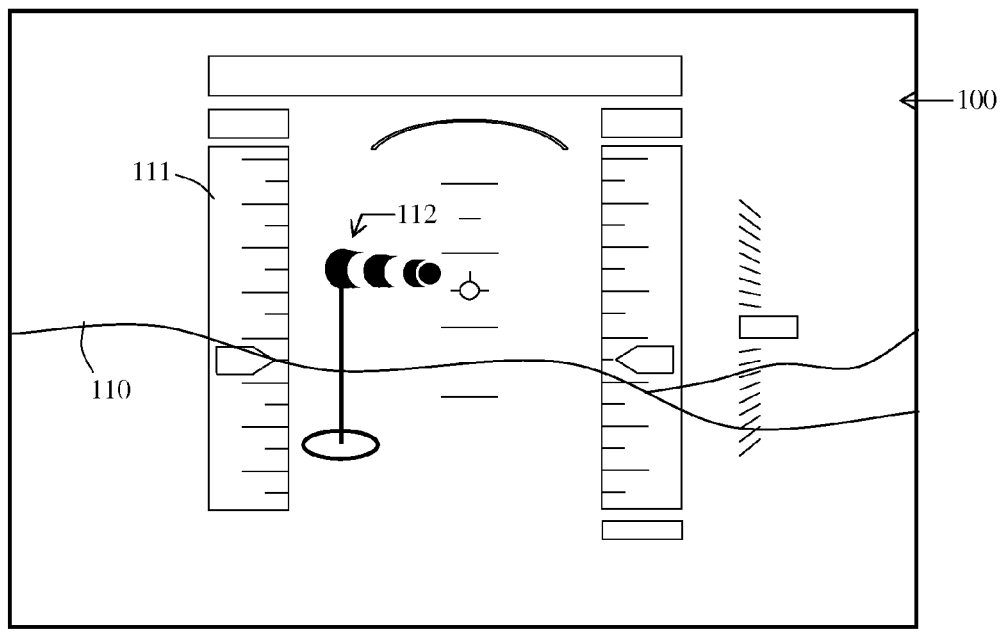
FIG. 2 represents a display of a final destination in the form of an air sock according to the invention.
Figure 3:
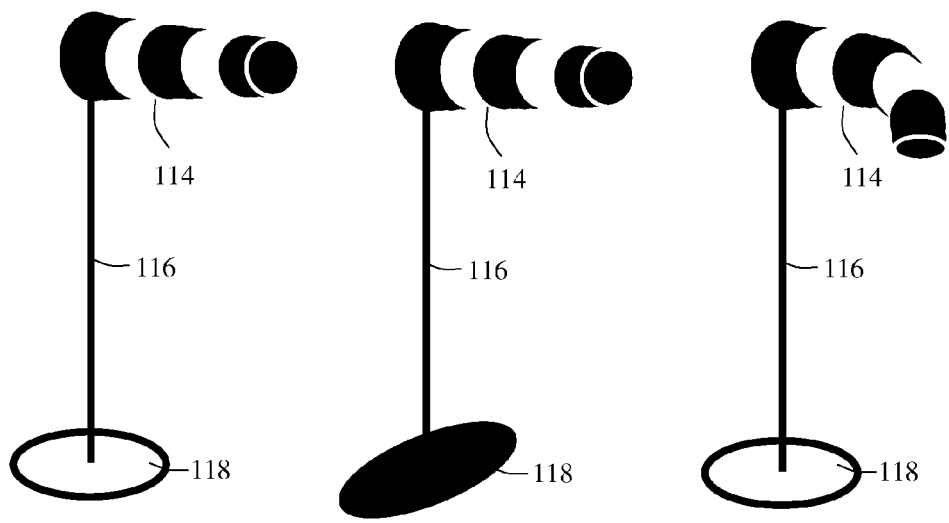
FIG. 3 represents different aspects of the representation of the air sock.

As an example, FIG. 2 represents a simplified view of the images 100 displayed by a device according to the invention. In this figure, the curved lines made up of continuous thin lines symbolize a perspective view of the relief of the terrain 110 as seen by the pilot. This figure also includes a symbology 111 of PFD type, PFD standing for "Primary Flight Display", symbolized essentially by graduated rectangles drawn using thin lines. In this figure, the air sock 112 is represented by bold lines. FIG. 3 represents three variant representations of the air sock as represented in FIG. 2 according to the wind and terrain conditions.

An adjustment can be made to the transparency of the air sock in order not to interfere with the reading of other symbologies such as the conventional ones of the PFD. It can be set for example at 50%. The default colour for these symbols is the white/red used to plot the conventional symbology. This colour may differ, provided that compliance with the aeronautical standards is ensured.

The air sock is represented if it is located between the aircraft and a certain selected distance d1. This distance d1 can be either selected by the pilot, or determined by the computer according to the speed of the aircraft, its altitude, etc. In our example, it is 10 Nautical Miles (NM). This provides the pilot with a better awareness of his final destination, and thus enables him to more easily determine the direction that he must follow to reach his objective and externally identify his landing area and its environment.

The symbol for this DIRECT TO point consists of three parts: the ground part 118 which indicates the gradient of the terrain, the junction line 116, also called mast, and a top part 114 which represents an air sock.

The top part 114 of the symbol represents an air sock. This representation of an air sock consists of a tapered sleeve made up of five rings that are alternately red and white. This representation has a two-fold objective: depending on its orientation, it gives the direction of the wind and depending on its inflation, it gives the wind speed. In practice, each colour band corresponds to a wind strength of approximately 5 knots (or 9 km/h). When the sleeve is horizontal, the wind is blowing at more than 25 knots (or 45 km/h) as represented on the left-hand drawing and the central drawing of FIG. 3; in the right-hand drawing, the sleeve is broken at the third ring, indicating that the wind is blowing at approximately 15 knots (or 27 km/h).

The top part 114 of this symbol is situated at a certain height h1 computed by the processor depending on the altitude and the speed of the aircraft, the surrounding terrain, etc. It is linked to the terrain by a junction line 116. This junction line 116 can equally be continuous or dotted with a fatter or thinner line thickness. From a certain distance, this height h1 is set to allow better discernment of the object and better awareness of the perspective and of the object type. This minimum set height h1 will be selected according to the mission, the type of terrain, etc. In our example, this minimum set height h1 is 50 feet.

The bottom part 118 of the symbol is situated on the synthetic "ground" and is positioned according to the actual position of the final destination. This bottom part represents the direction of the terrain gradient and an indication of the value of this gradient. It is represented by an ellipse. The two faces of this ellipse have a different colour or texture. In the examples of FIG. 3, the reverse face pointing towards the ground is black, the face pointing towards the sky is white. Depending on the direction of the gradient relative to the aircraft, the representation differs. If the gradient of the terrain is zero then the ellipse is no more than a line. If the gradient of the terrain has an inclination to the right relative to the aircraft, the ellipse is also inclined to the right, with the right-hand part lower than the left-hand part. This inclination depends on the percentage of the gradient. Similarly, if the gradient is upward relative to the aircraft, the white face of the ellipse is displayed and, conversely, if the gradient is downward, then only the black part is visible. This differentiation between the two faces of the ellipse can also be achieved by different colours or different patterns. The percentage of the gradient is represented by a more or less thick ellipse. The greater this percentage, that is to say, the greater the gradient, the thicker the ellipse becomes. In the example of the central drawing of FIG. 3, the gradient of the terrain located under the air sock is downward and directed towards the right.

The air sock symbol is drawn in a way that conforms to the landscape, in other words it is positioned in its actual position. Furthermore, it is represented in perspective: the further it is from the aircraft, the smaller it becomes. Since this symbol has a minimum fixed height h1 from a certain distance, it is easier for the pilot to mentally work out the distance that separates him from his final destination and have a better awareness of the direction to take.

Figure 4:
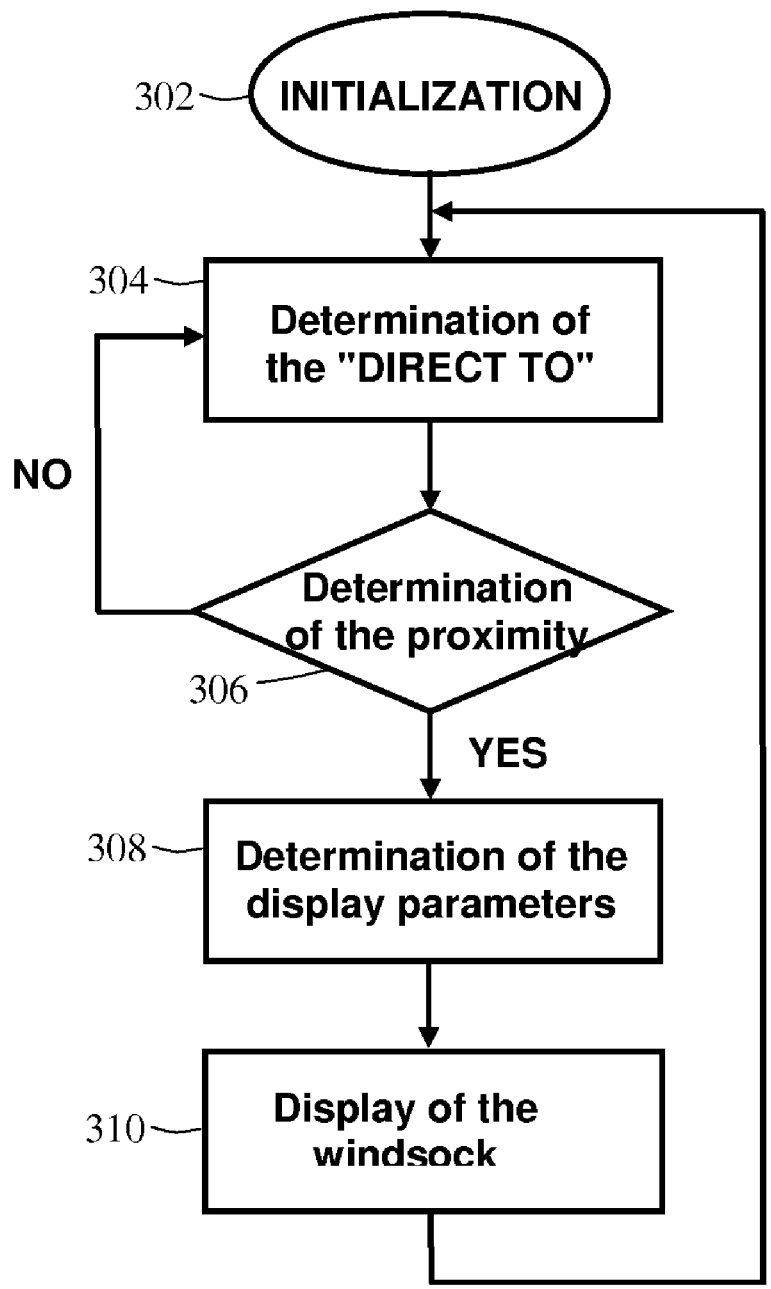
FIG. 4 represents the flow diagram of the inventive display method.

FIG. 4 is a flow diagram showing a procedure for displaying this DIRECT TO point in perspective view in accordance with the present invention.

Step 302: Initialization

Step 304: The DIRECT TO point entered is sought. This search is carried out, for example, by using one or more processors that use the current position of the aeroplane to determine whether the DIRECT TO point is within a perimeter close to the aeroplane.

Step 306: The processor determines whether the DIRECT TO point is located within the selected distance d1 relative to the position of the aircraft. If it is not situated in this area, then the process returns to step 304. This search loop continues until the DIRECT TO point fulfills this location condition. This loop is a way of not cluttering the screen display. Since the user manages a large quantity of information, it is beneficial not to display this DIRECT TO point if it is too far away. The selected distance d1 can be 10 NM for example.

Step 308: The processor determines the location, the level of transparency for displaying this point. It also determines the orientation and the form of the air sock according to the wind data. It also calculates the thickness of the ellipse, the form of the base of the symbol, the face to be displayed or its right/left inclination depending on the gradient of the terrain of the final destination.

Step 310: The DIRECT TO point is displayed on the screen according to its position, etc. The process is repeated from step 304. The repetition rate can be 30 times per second.

The main field of application for the system and the method according to the invention is aeronautics. In this field, the aircraft can be a rotating or fixed wing craft. Obviously, the aircraft can also be a drone or an "Unmanned Air Vehicle" (UAV) controlled from the ground.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A viewing system of the synthetic vision system SVS type, for an aircraft, said system comprising at least one navigation database, a cartographic database of a terrain, position sensors, anemometric sensors, terrain gradient measurement sensors, an electronic computer, a man-machine interface means and a display screen, the computer comprising means of processing the various information obtained from the databases, from the sensors and from the interface means, said processing means arranged to provide on the display screen a synthetic image of the terrain comprising a representation of the final destination, wherein said representation includes a physical representation of an aeronautical-type air sock comprising three parts, a bottom part situated at the conformal location of the position of the final destination on the terrain, a vertical junction line and a perspective representation of the air sock itself, positioned above said junction line, the form and the orientation of the bottom part being representative of the local gradient of the terrain at the location of said air sock.

2. The viewing system according to claim 1, wherein the bottom part is an ellipse, the inclination of which is representative of the local gradient of the terrain, said ellipse having two faces of different color or texture, the displayed color being representative of the direction of the gradient as seen from the aircraft.

3. The viewing system according to claim 1, wherein the junction line has a sufficient size for the standardized symbol to dominate the surrounding terrain and not be concealed by the relief.

4. The viewing system according to claim 1, wherein the perspective representation of the air sock has the form of an elongate truncated cone comprising five rings, the first, third and fifth rings being of a first color, the second and fourth rings being of a second color, the orientation of the cone being representative of the wind direction, the cone including a break, the set of rings positioned in front of the break representing the wind speed.

5. The viewing system according to claim 1, wherein, from a certain distance, the representation of the air sock has an apparent display size that is representative of a constant size on the terrain.

6. Final destination display method for synthetic vision system (SVS) type viewing system mounted on an aircraft, said system comprising at least one navigation database, a cartographic database of a terrain, position sensors, anemometric sensors, sensors for measuring the gradient of said terrain, an electronic computer, a man-machine interface means and a display screen, the computer comprising means of processing the various information obtained from the databases, from the sensors and from the interface means, said processing means arranged so as to provide on the display screen a synthetic image of the terrain including a representation of the final destination, the said method comprising the following steps:

reception of the coordinates of the final destination and analysis of the latter;

determination of the distance to said final destination;

if the final destination is at a distance less than a first distance, computation of the anemometric parameters and of the local gradient of the terrain;

display of the final destination in the form of an air sock represented in perspective on the display screen, the form and the orientation of the bottom part of the air sock being representative of the local gradient of the terrain at the location of said air sock.

* * * * *